United States Patent [19]

Bojas et al.

[11] 4,091,717
[45] May 30, 1978

[54] RING DAMPENER FOR ROTARY FLUID PRESSURE DEVICE

[75] Inventors: Edward J. Bojas; David C. Ours, both of Marshall, Mich.

[73] Assignee: Eaton Corporation, Cleveland, Ohio

[21] Appl. No.: 680,991

[22] Filed: Apr. 28, 1976

Related U.S. Application Data

[63] Continuation-in-part of Ser. No. 597,058, Jul. 18, 1975, abandoned.

[51] Int. Cl.² .................... F01B 13/06; F16D 31/02
[52] U.S. Cl. .................................. 91/498; 60/469; 418/31
[58] Field of Search ............... 91/491, 486, 504–506, 91/497; 60/469, 489; 418/31; 417/273

[56] References Cited

U.S. PATENT DOCUMENTS

| | | | |
|---|---|---|---|
| 2,936,589 | 5/1960 | Quintilian | 60/469 |
| 3,354,637 | 11/1967 | Iroswhile | 60/489 |
| 3,385,059 | 5/1968 | Leonard et al. | 417/273 |
| 3,499,391 | 3/1970 | Chao et al. | 91/506 |
| 3,626,810 | 12/1971 | Morey | 91/497 |
| 3,635,126 | 1/1972 | Engel et al. | 91/486 |
| 3,658,446 | 4/1972 | Jansson | 418/31 |
| 3,682,044 | 8/1972 | Anthony | 91/506 |
| 3,740,953 | 6/1973 | Mori | 60/489 |
| 3,872,775 | 3/1975 | Clerk | 91/486 |

*Primary Examiner*—William L. Freeh
*Attorney, Agent, or Firm*—R. J. McCloskey; J. W. Yakimow

[57] ABSTRACT

A vibration reducing shoe for biasing a cam ring of a variable displacement ball pump into engagement with a surface of the pump housing. In a hydrostatic transmission having a variable displacement pump and a fixed displacement motor a pair of shoes are located within bores in the pintle. The shoes are slidably received in the bores and exert a force against the cam ring which is proportional to the pressure of the fluid used to rotate the motor. Since the pump is reversible, one shoe is in fluid communication with one of the passages directing fluid to the motor and the other shoe is in fluid communication with the other passage. Accordingly, the force exerted on the cam ring by the shoes increases and decreases with increases and decreases in the pressure of the fluid from the pump to the motor.

9 Claims, 4 Drawing Figures

RING DAMPENER FOR ROTARY FLUID PRESSURE DEVICE

This is a continuation-in-part of application Ser. No. 597,058, filed July 18, 1975 now abandoned.

FIELD OF THE INVENTION

This invention relates generally to an improvement in variable displacement rotary fluid pressure devices and finds particular utility in radial piston pumps and motors.

DESCRIPTION OF THE PRIOR ART

Variable dislacement hydrostatic transmissions are used in industrial and semi-industrial applications as well as on lawn and garden tractors. These Transmissions provide: smooth speed change from full forward to full reverse in a single control; complete matching of power to load; positive control; and dynamic braking. However, such hydrostatic transmissions tend to have internal components in either the pump, motor or both that vibrate at frequencies that may be undesirable or disturbing in certain application. The component vibrations can be fed through control linkages and create noises which are undesirable to the operator. Of the various types of variable displacement hydrostatic transmissions available, the radial piston types are particularly distinguished by application adaptability, compactness, and economy.

SUMMARY OF THE INVENTION

It is accordingly an object of the invention to provide a variable displacement radial piston hydrostatic transmission having reduced vibrational characteristics.

A further object is to accomplish such vibration reduction with a minimal design change and cost penalty.

According to a feature of the invention, vibrations within a variable displacement radial piston hydrostatic transmission have been reduced by providing a restraining shoe between the transmission housing and the movable cam ring and increasing the force exerted by the shoe on the cam ring in proportion to increases in the pressure of the fluid within the transmission.

BRIEF DESCRIPTION OF THE DRAWINGS

FIG. 1A is an enlarged view of a portion of FIG. 1;

DESCRIPTION OF THE PREFERRED EMBODIMENT

Figure 1:
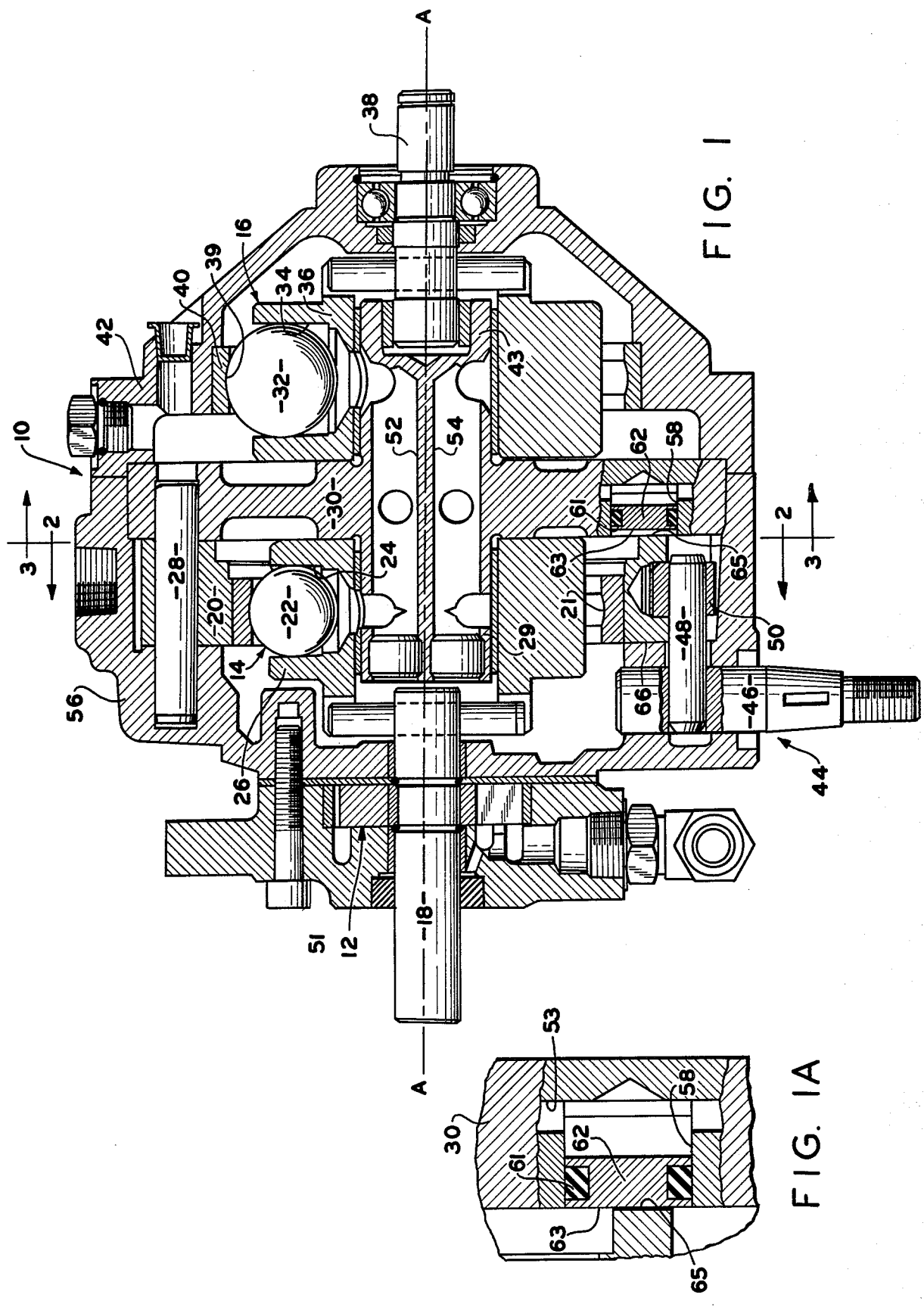
FIG. 1 is a fragmentary, sectional, side elevational view of a hydrostatic transmission taken generally along its longitudinal centerline.
Figure 2:
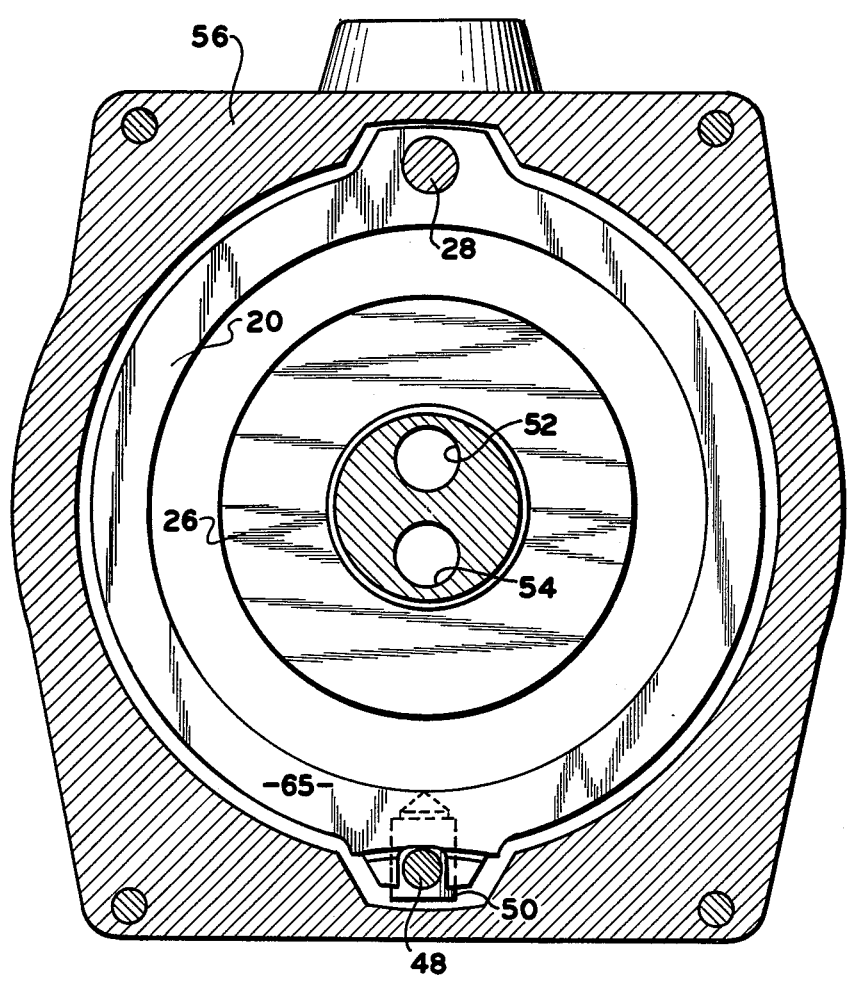
FIG. 2 is a sectional view of the entire transmission taken along line 2—2 of FIG. 1.

FIG. 1 illustrates a variable displacement hydrostatic transmission having a housing 10 enclosing a make-up pump 12, a variable displacement radial ball pump 14 and a fixed displacement radial ball motor 16. The transmission is generally similar to a Model 10 hydrostatic transmission sold by Eaton Corporation.

A prime mover (not illustrated) is connected to an input shaft 18 to simultaneously rotate components of make-up pump 12 and ball pump 14. Ball pump 14 includes a movable cam ring assembly 20 having a circular concaved race 21 which mates with pump balls 22 located in bores 24 of an annular pump rotor 26. Cam ring 20 is free to pivot about the axis of a cam pivot pin 28 to vary the eccentricity of race 21 relative to the longitudinally disposed axis A—A of the transmission. Rotation of pump rotor 26 about a boss 29 of a pintle 30 moves balls 22 radially outwardly and inwardly in bores 24 causing fluid to be forced by balls 22, as they contact the eccentric race 21, through internal portions of pintle 30 to one side of motor balls 32 located within bores 34 that are within an annular motor rotor 36. Motor rotor 36 is connected to an output shaft 38 which is axially aligned with axis A—A and input shaft 18. Balls 32 move radially outwardly under the pressure of the fluid from pump 14 into contact with a circular concaved race 39 on a cam ring 40 of motor 16. Cam ring 40 is rigidly secured to a body portion 42 of housing 10 and has race 39 eccentric relative to axis A—A. Motor rotor 36 is rotated around another boss 43 of pintle 30 by movement of balls 32 into and out of bores 34. Appriori- ate seals, bearings, and bushines are provided throughout the transmission to prevent fluid from escaping from housing 10 and to allow for rotation of the various components.

An appropriate control arrangement 44 including a control shaft 46, a control pin 48, and a cam ring insert 50 is provided to pivot cam ring 20 about pivot pin 28. Such pivotal movement is accomplished by rotating control shaft 46 about its axis which turns control pin 48 and accordingly moves can ring insert 50 and cam ring 20. Movement of cam ring 20 allows for pump 14 to vary from full displacement in one direction to zero displacement to full displacement in the other direction.

The direction of rotation of motor 16 and accordingly output shaft 38 is dependent upon what passage 52 or 54 within pintle 30 is fed fluid by balls 22 of pump 14. For exampley, clockwise rotation of motor 16 can be accomplished by the balls 22 forcing high pressure fluid through bores 24 into passage 54 and then into bores 34 of motor 36. Low pressure fluid will accordingly be returned from motor 16 to pump 14 via passage 52. Counterclockwise rotation of motor 16 would accordingly occur when high pressure fluid is forced by balls 22 through bores 24 into passage 52 and then into bores 34. Appropriate porting is provided to transfer fluid between passages 52 and 54 and bores 24 and 34.

Make-up pump 12 has a rotor 51 keyed to input shaft 18 and accordingly provides make-up fluid whenever ball pump 14 is in operation. Appropriate check valves are used to control the fluid flow from pump 12 to the interior of housing 10. The make-up pump may be of any known design and is illustrated as a roller pump.

Applicants have discovered that during operation of the disclosed transmission vibrations may be set up in cam ring 20. Such vibrations are fed back through cam ring insert 50, control pin 48, and control shaft 46 to the control linkage used to vary the displacement of pump 14. These vibrations can result in undesirable noise being generated in the control linkage and excessive wear on related components. Further, vibrations are also fed back through the mounting brackets used to retain the transmission in its given environment. If the frequencies of the vibrations happen to correspond with resonant frequencies of the linkage or mounting brackets, undesirable noise will occur. It has been determined by applicants that such vibrations increase in proportion to the pressure of the fluid within housing 10. It has been known heretofore to bias cam ring 20 against the cover portion 56 of housing 10 by springs located in pintle 30. Such spring biasing, however, only controls vibration during certain operating conditions of the transmission. Spring biasing further has an undesirable side effect of requiring additional control effort at all but one operation condition. It was discovered by applicants that the provision of a variable force acting against the movable cam ring 20 could greatly reduce the vibrations of the cam ring and accordingly the noise of the surrounding components. It was further discovered by applicants that such force against the movable cam ring 20 would have to be increased as the pressure within the transmission is increased.

Figure 3:
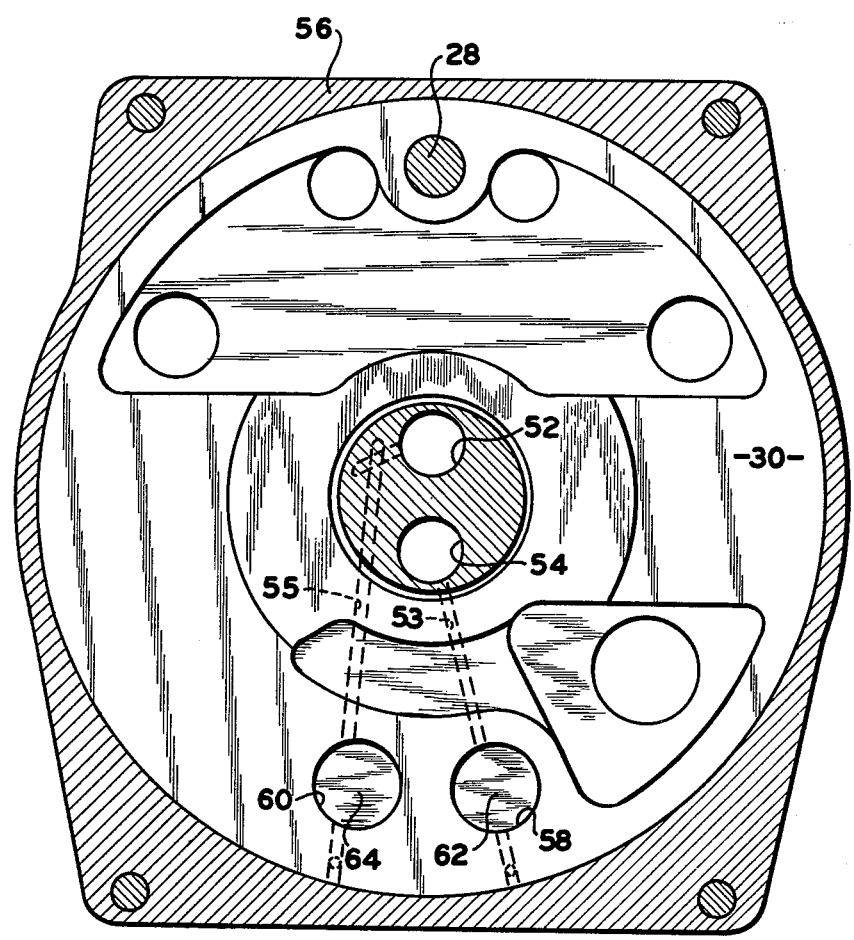
FIG. 3 is a sectional view of the entire transmission taken along line 3—3 of FIG. 1.

Accordingly, applicants have provided a novel dual restraining shoe arrangement within pintle 30 to control the vibration of cam ring 20. This arrangement is best seen in FIGS. 1, 1A and 3 wherein there is provided two bores 58 and 60 within pintle 30 opening toward cam ring 20. Bore 58 is in fluid communication with passage 54 via passage 53 within pintle 30. Similarly bore 60 is in fluid communication with passage 52 via a series of passages 55 within pintle 30. Shoes 62 and 64 are respectively located in bores 58 and 60 and include appropriate O ring sealing means (item 61 in FIGS. 1 and 1A) to prevent the transfer of fluid across the periphery of the shoes.

During clockwise rotation of shaft 38, high pressure fluid is being fed through passage 54 from pump 14 to motor 16 causing the face 63 of shoe 62 to be moved outwardly into contact with an end portion 65 of cam ring 20 (FIG. 1A).. Such outward movement forces the opposite end portion 66 of cam ring 20 into contact with a surface on cover 56. As the pressure is increased within the transmission and accordingly passage 54 and bore 58, the force exerted by face 63 of shoe 62 on cam ring 20 is also increased. The clamping force exerted by cover 56 and shoe 62 on cam ring 20 greatly reduces the amount of vibration that is permitted to occur in the cam ring and accordingly reduces the possibility of noise created by the transmission and wear within the transmission. During counterclockwise rotation of the transmission, passage 52 transfers high pressure fluid from pump 14 to motor 16. This results in shoe 64 moving into contact with the end portion 65 of cam ring 20 forcing the opposite end portion 66 of the cam ring into contact with the surface on cover 56 resulting in vibration and wear reduction.

It can be seen from the foregoing that the force exerted on cam ring is directly proportional to the pressure on the fluid created by pump 14. The cycling forces within the transmission are also directly proportional to the pressure of the fluid from pump 14 so that the restraining force exerted by shoes 62 or 64 is directly proportional to the exciting force. Although the dual shoe arrangement has been illustrated for the purpose of this disclosure, it should be appreciated that the concept would work equally well with a single shoe and appropriate valving to transfer fluid from the passage 52 or 54 having the highest fluid pressure to the shoe. Also, the shoe or shoes could be located in cam ring 20 and exert the biasing force against pintle 30 or cover 56. Further, although the concept of biasing the cam ring has been illustrated in reference to a radial piston ball pump, it is also applicable to vane units, piston units, or other radially extending pumping elements having a movable ring.

It has further been determined that wear of aluminum cover 56 caused by contact with iron cam ring 20 can be reduced by inserting a steel plug into cover 56 opposite from shoes 62 and 64. The steel plug will wear considerably less than the aluminum cover 56 when contacted by cam ring 20.

In the disclosed arrangement, the diameter of the bores 58 and 60 and accordingly the shoes 62 and 64 are approximately ⅞ of an inch. This diameter will vary for other designs with: the maximum pressure of the fluid; the mass of cam ring 20; the diameter of cam ring 20; the materials of cover 56, cam ring 20, and shoes 62 and 64; the number of balls 22 within pump 14; the distance from the cam ring pivot point to the shoes; and the port timing of the pump.

The invention has been illustrated in combination with a standard Model 10 hydrostatic transmission sold by Eaton Corporation. The transmission has only been modified to the extent of the variable force shoes 62 and 64 located in pintle 30 and the provision of the steel plug in cover 56. Other portions of the transmission have been manufactured and sold for a number of years and are therefore well known to those skilled in the art. It may readily be seen that the vibrations created and the wear occurring within the transmission have been greatly reduced with only a minor increase in the complexity and cost of the transmission.

The invention may also be used in other variable displacement pumps or motors. For example, the annular ring member illustrated in the drawings could encircle a vane pump wherein the vanes would be movable in a known manner in and out of openings within the rotor to vary the displacement of the cavity between each adjacent vane. The shoe or shoes in such an arrangement would be used as illustrated in the drawings to resist axial movement of the annular ring.

What is claimed is:

1. A rotary fluid pressure device for use as a pump or motor comprising:
   A. a housing member having a cavity and a pair of confronting axially spaced surfaces;
   B. a rotor located within the cavity and having a plurality of circumferentially spaced, radially extending bores;
   C. a piston located within each of the bores;
   D. inlet port means for directing fluid to certain bores;
   E. outlet port means for directing fluid from certain bores;
   F. means supporting the rotor relative to the housing member for rotation about an axis;
   G. a movable annular ring member disposed between the surfaces, encircling the rotor and engaged with the pistons; and
   H. means for reducing the vibration of the ring member during rotation of the rotor by moving the ring member away from one of the surfaces into engagement with the other surface, said means including
      (1) a shoe supported by one of the members for axial movement into engagement with the other member, and
      (2) means for exerting a force on the shoe in an axial direction to move the shoe into engagement with the other member, the magnitude of the exerted force on the shoe being proportional to the magnitude of the pressure of the fluid within certain of the bores.

2. A rotary fluid pressure device as set forth in claim 1 wherein:

I. means pivotally support the ring member relative to the housing member for movement about an axis offset relative to the axis of rotation of the rotor.

3. A rotary fluid pressure device as set forth in claim 1 wherein:
   I. the housing member includes a pintle;
   J. the means for reducing the vibration includes a bore located within the pintle;
   K. the shoe is located within the bore in the pintle and is movable therein; and
   L. the means for exerting the force includes a passage communicating with the bore in the pintle and with the bores in the rotor having the greatest fluid pressure.

4. A rotary fluid pressure device as set forth in claim 3 wherein the pistons are balls.

5. A rotary fluid pressure device as set forth in claim 1 wherein:
   I. the means fo reducing vibration includes at least two shoes supported by one of the members for movement into engagement with portions of the other member; and
   J. the means for exerting a force exerts a greater force on one of the shoes than on the other shoe.

6. A rotary fluid pressure device as set forth in claim 5 wherein:
   K. the housing member includes a pintle;
   L. the means for reducing the vibration includes at least two bores located within the pintle;
   M. a shoe is located within each of the bores of the pintle and is movable therein; and
   N. the means for exerting the force includes
       (1) a passage communication with one of the bores in the pintle and with at least one of the bores in the rotor, and
       (2) another passage communicating with another bore in the pintle and with at least another bore in the rotor.

7. A rotary fluid pressure device for use as a pump or motor comprising:
   A. a housing member defining a cavity and a pair of confronting axially spaced surfaces;
   B. a rotor located within the cavity and having a plurality of circumferentially spaced radially extending openings;
   C. an element movable within each of said openings;
   D. a chamber partially defined by each element and adjustable in size with movement of said element;
   E. means supporting the rotor relative to the housing member for rotation about an axis;
   F. a confining member disposed between the surfaces, encircling the rotor, engaging the elements, and being movable relative to an axis to adjust the maximum extent of movement in one direction of the elements within the openinga; and
   G. means for reducing the vibration of the confining member during rotation of the rotor, said means including
       (1) a shoe supported by one of the members for axial movement into engagement with the other member; and
       (2) means for exerting a force on the shoe in an axial direction to move the shoe into engagement with the other member, the magnitude of the exerted force on the shoe being proportional to the magnitude of the pressure of the fluid within certain of said chambers.

8. The improvement set forth in claim 7 wherein said means for reducing vibration includes at least two shoes diametrically opposed relative to one another, each show being located in one of the members for movement into engagement with the other member.

9. The improvement set forth in claim 7 wherein the shoes are located within the housing and the magnitude of the exerted force on the shoes is proportional to the magnitude of the highest pressure of the fluid within the bores.

* * * * *